CIRCUIT AND TECHNIQUE FOR DIVIDING PULSE SIGNALS OVER A WIDE DYNAMIC RANGE OF INPUTS

Filed Feb. 4, 1963

INVENTORS.
WILLIAM P. MAYNE
DUANE J. RUSSELL
LANGTHORNE SYKES

BY

ATTORNEY.

United States Patent Office 3,222,508
Patented Dec. 7, 1965

3,222,508

CIRCUIT AND TECHNIQUE FOR DIVIDING PULSE SIGNALS OVER A WIDE DYNAMIC RANGE OF INPUTS

William P. Mayne, Ridgecrest, Duane J. Russell, China Lake, and Langthorne Sykes, Manhattan Beach, Calif., assignors to the United States of America as represented by the Secretary of the Navy Filed Feb. 4, 1963, Ser. No. 256,178
3 Claims. (Cl. 235—196)
(Granted under Title 35, U.S. Code (1952), sec. 266)

Figure 1:
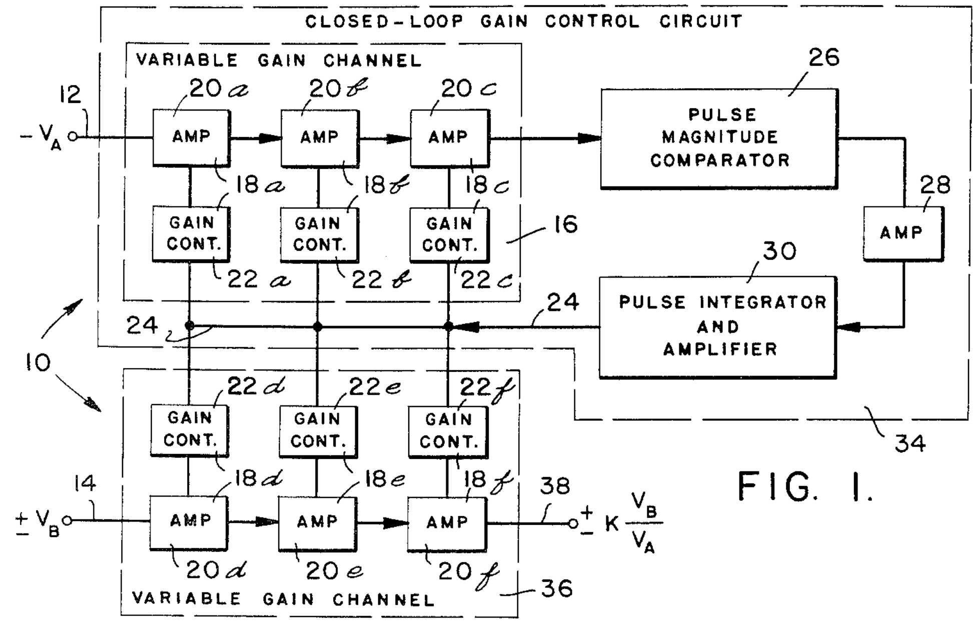

The invention described herein may be manufactured and used by or for the Government of the United States of America for governmental purposes without the payment of any royalties thereon or therefor.

The present invention relates to a dividing circuit, and more particularly to a circuit and techniques for dividing one pulse signal by another pulse signal over a very wide dynamic range of inputs.

The present invention finds special application in a missile guidance system for a long range missile that automatically steers itself toward a source of radiating pulse signals. The signal pulses emanating from the target source are received on the missile by a pair of mutually offset directional antennas with the result that the outputs of the pair of antennas, together, contain information with respect to the direction of the target. However, before any guidance steering signals may be derived from the antenna outputs, the intensity component of the received signal, which is the result of range, power of the radiating source, etc., must be removed. Removal of such intensity component is done by choosing two pulses signals having the intensity component in common, and dividing one of these by the other. The extremely wide dynamic range of signals at the inputs of the system, where such division must be made in order to be effective, poses a very difficult problem. At the beginning of the flight of a missile the dividing circuit must be capable of dividing pulse signals where they are barely discernible from noises contained in the reception. Near the end of the flight, the missile is flying through zones where the strength of the field radiation from the radiating source exceeds the saturation limits of conventional circuitry. The problem is further aggravated where, as in military equipment, the more rugged and compact solid-state device circuitry is desired, because it is especially prone to saturation.

The invention is in some respects a modification and extension of some basic principles and techniques disclosed in U.S. Patent 2,845,528 to J. E. Brooks, entitled "Dividing and Limiter Circuit." While the electronic tube circuitry disclosed in that patent is useful for many purposes, the well known inherent limitations of such circuits of this kind make it virtually impossible to achieve dynamic ranges in excess of 10 to 20 decibels. On the other hand, system requirements for guided missiles of the type referred to require capabilities of handling dynamic ranges in the order of 90 decibels.

An object of the present invention is to provide a circuit capable of operation over very wide dynamic ranges.

Another object is to provide an all solid-state device dividing circuit which is rugged, stable under a wide range of temperature conditions, and compact to assemble.

Figures 2, 3:
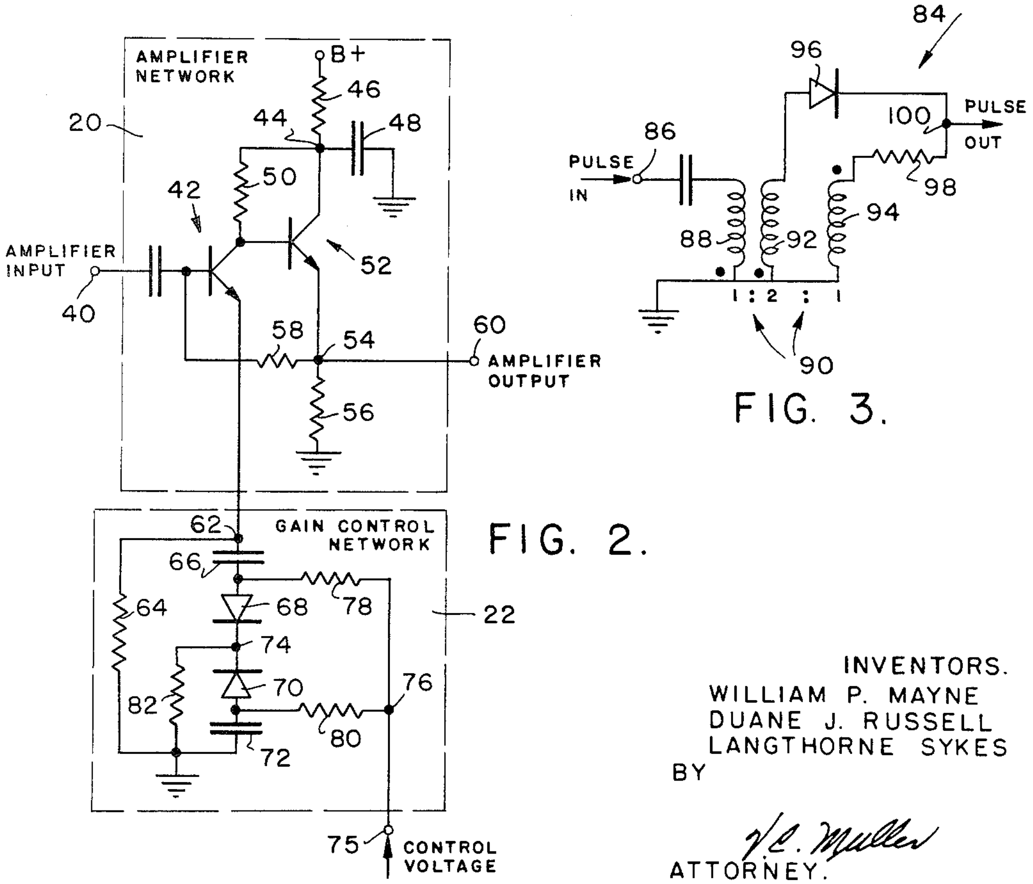

Other objects and many of the attendant advantages of this invention will be readily appreciated as the same becomes better understood by reference to the following detailed description when considered in connection with the accompanying drawings wherein:

FIG. 1 is a functional block diagram of circuit elements of a dividing circuit embodying the present invention, FIG. 2 is a schematic wiring diagram of a variable gain stage of FIG. 1, and FIG. 3 is a schematic wiring diagram illustrative of a pulse comparator for the circuit of FIG. 1.

Referring now to the drawing and in particular to FIG. 1, a circuit 10 is a dividing circuit which produces an output $V_B/V_A$, proportional to the quotient of a divisor quantity represented by a variable amplitude periodic pulse signal $V_A$ divided by a dividend quantity represented by a signal $V_B$ of like kind. Divisor signal $V_A$ is applied to an input lead 12, and dividend signal $V_B$ to an input lead 14. The pulses of divisor signal $V_A$ are always of negative polarity and the pulses of signal $V_B$ may sometimes be positive and sometimes be negative, as indicated by the plus and minus signs on the drawing.

Divisor signal $V_A$ is applied via lead 12 to a variable gain channel 16 comprising variable gain amplifier stages 18*a*, 18*b*, 18*c* connected in cascade. Each amplifier stage 18 in turn comprises a set consisting of an amplifier network 20 and an associated gain control network 22, which controls the A.C. gain characteristic of the amplifier network in response to a positive D.C. gain control voltage from a control line 24. Gain control 22 is operative to selectively increase or decrease the gain of amplifier network 20 in response to a corresponding increase or decrease of voltage applied to it from line 24. The detailed structure of amplifier network 20 and gain control network 22 will be described with respect to FIG. 2. In the conventional manner of amplifier stages, polarity inversion takes place across each stage with the result that the amplified pulse appearing at the output of stage 18*c* has a positive polarity.

A pulse magnitude comparator 26 compares the amplitude of each positive pulse appearing at the output of channel 16 with a predetermined reference level $k_1$ of positive voltage, and produces at its output a pulse of negative or positive polarity depending upon whether the input pulse is below or above $k_1$ and with the magnitude of the output pulse proportional to the difference between the amplitude of input and $k_1$. The output of comparator 26 is passed through and inverted by a fixed gain amplifier 28 and applied to a pulse integrator and amplifier 30. Pulse integrator 30 receives the sometimes positive and sometimes negative pulses applied to its input and produces a positive D.C. voltage, the magnitude of which varies in proportion to the time integral of the pulse amplitude, with the integrator output becoming more positive in response to positive pulses and becoming less positive in response to negative pulses. Integrator 30 may be essentially the same as the circuit disclosed in co-pending application S.N. 149,134, filed October 31, 1961, now Pat. No. 3,119,029, entitled "Transistor A.C. Integrator." The output of pulse integrator and amplifier 30 is connected to gain control line 24, providing the gain control voltage for controlling gain control networks 22.

Variable gain channel 16, comparator 26, and integrator 30 together form a high gain negative feedback closed-loop circuit 34 for automatically maintaining the output of channel 16 equal to the reference level of comparator 26. The polarity of comparator 26 determines the direction of change of output of integrator 22 which in turn controls individual gain control networks of each set consisting of an amplifier and a gain control to selectively increase or decrease the gain of channel 16 in the proper sense to eliminate any difference between the amplitude of the output pulse from channel 16 and the reference level $k_1$. Thus, the magnitude of pulse amplitude from comparator 26 is maintained substantially constant and equal to $k_1$.

Dividend signal $V_B$ is applied via lead 14 to a variable gain channel 36, which is identical in structure to channel 16, being constructed of amplifier states 18*d*, 18*e*, 18*f* formed from corresponding amplifier gain control network 20*d*, 20*e*, 20*f* and 22*d*, 22*e*, 22*f*. The D.C. gain control voltage appearing in control line 24 as the result of the circuit action of closed-loop circuit 34, is applied to each individual gain control network in channel 36. Since the circuit action of feedback network 24 is to maintain the output of divisor channel 16 constant, the gain control voltage from control line 24 varies the gain of channel 36 in accordance with a reciprocal function of divisor signal $V_A$, and since the gain characteristics of channel 36 are identical to those of channel 16, the application of the gain control voltage from control line 24 to gain control networks 18*d*, 18*e*, 18*f* will cause the gain of channel 36 to also vary as a reciprocal function of divisor signal $V_A$, producing the desired quotient signal $$K\frac{V_B}{V_A}$$

at output lead 38 from channel 36. A detailed mathematical treatment of the operation of a similar circuit is contained in mentioned U.S. patent to Brooks.

It is to be appreciated that cascading the three amplifier stages in each of channels 16 and 36, with the gain control unit for each cascaded gain stage individually and independently under the control of the gain control voltages, produces a dynamic range in accordance with the cube of the ratio of the high and low gains of each gain stage.

Referring now to FIG. 2, within each set consisting of an amplifier network 20 and a gain control network 22, a terminal 40 forms an amplifier input. From there the signal is coupled through a D.C. blocking capacitor to the base of a NPN type transistor 42. A source of positive transistor operating voltage B+ is connected to a junction 44 through a resistor 46, and an A.C. bypass capacitor 46 is connected between junction 44 and ground. Resistor 46 and capacitor 48 form a filter network which serves to effectively place junction 44 at A.C. or signal ground. Transistor 42 has its collector connected to junction point 44 through a load resistor 50 and its emitter returned to A.C. and D.C. ground through gain control network 22, as will become apparent. The signal appearing at the collector of transistor 42 is directly coupled to the base of another NPN type transistor 52, having its collector connected directly to junction 44 and its emitter is connected to a junction 54, and thence returned to ground through an emitter load resistor 56. A feedback resistor 58 is connected between junction point 54 and the base of transistor 42, which resistor 58 serves as a D.C. path applying positive operating bias to the base, and also serves as a D.C. negative feedback circuit which provides added stability in the D.C. operation of the transistor. A terminal 60 connected to junction 54 forms the amplifier output. Within gain control unit 22, the lead from the emitter of transistor 42 is received at a junction 62. Parallel connected between junction 62 and ground are a D.C. circuit path consisting of a resistor 64, and an A.C. circuit path comprising a series circuit including a D.C. blocking capacitor 66, a diode 68, another diode 70, and another D.C. blocking capacitor 72. The blocking capacitor 66 is connected between junction 62 and the anode of diode 68, the cathode of diode 68 and the cathode of diode 70 are connected together at a junction 74, and the blocking capacitor 72 is connected between the anode of diode 70 and ground. A terminal 75 forms the input which receives the gain control voltage from control line 24, FIG. 1. Terminal 75 is connected to a junction 76 and thence through parallel branches consisting of equal limiting resistors 78 and 80 to the anodes of diodes 68 and 70, respectively. Another limiting resistor 82 is connected between junction 74 and ground, and further serves to isolate junction point 74 and in turn the A.C. circuit path from D.C. ground. Series connected resistor 78 and diode 68, and series connected resistor 80 and diode 70, form like parallel circuit links between junctions 74 and 76, that result in equal D.C. bias currents through diodes 68 and 70 in their respective forward directions under the positive gain control voltage applied to terminal 75. It is to be appreciated that whereas the A.C. signal path between the emitter of transistor 42 and ground passes through diodes 68 and 70 in series circuit, the diodes are poled with their respective forward directions in mutually opposite circuit directions in such A.C. circuit path.

The operation of amplifier network 20 and gain control network 22 is as follows: Transistor 42 and its associated elements form a pulse amplifying circuit of the common emitter type. Transistor 52 and its associated elements form an output circuit of the emitter follower type to raise the power level of the amplifier pulse and to act as a buffer to prevent the succeeding stage from loading down the amplifier circuit. It is characteristic of common emitter type amplifier circuits that their gain is approximately proportional to the ratio of the impedance in their collector circuit to the impedance in their emitter circuit. The A.C. or dynamic impedance of diodes 68 and 70 varies in accordance with an inverse relationship to the forward D.C. current bias through them and these diodes serve as series connected variable impedance devices in the A.C. circuit path of the emitter of transistor 42 to vary the gain of the amplifier under control of the voltage applied to terminal 74. Under an increase in control voltage, the forward current bias through the diodes increases, the A.C. impedance of the diodes decrease, and the total effective impedance in the emitter circuit decreases. As a consequence, the ratio of collector circuit impedance to emitter circuit impedance of the common emitter amplifier formed by transistor 42 increases, and the amplifier gain increases. Conversely, the amplifier gain decreases under a decrease in control voltage. Since the diodes 68 and 70 are biased by equal current and poled with their respective forward directions in mutually opposite directions of the A.C. circuit path, the pair of diodes act as a symmetrical impedance to either polarity sense of pulse passing through the amplifier. Symmetry of impedance characteristics is particularly important in the case of dividend channel 36 which amplifies pulses of either polarity.

Referring now to FIG. 3, a network 84 illustrative of comparator 28, FIG. 1, comprises an input terminal 86 which receives the positive pulse output from channel 16. From there the pulse is coupled via a D.C. blocking capacitor to a primary winding 88 of a pulse transformer 90. Transformer 90 also has a pair of secondary windings 92 and 94, each having one of their ends connected to ground. The relative direction of windings 88, 92 and 94 are such that a pulse induced into winding 92 will have the same polarity as that impressed upon primary winding 88, and the pulse induced into winding 94 will have opposite polarity as indicated in conventional manner by a dot adjacent one end of each winding. The ratio of turns of windings 88, 92 and 94 is 1:2:1, also indicated in the conventional manner on the drawing. The high end of secondary winding 92 is connected to the anode of a silicon diode 96 and the high end of secondary winding 94 is connected to one end of a resistor 98. The cathode of diode 96 and the other end of resistor 98 are connected to a junction or summing point 100. The relative values of resistor 98, and the input impedance of the succeeding fixed gain amplifier are so chosen that resistor 98 and diode 96 effectively form a unity ratio summing network with junction 100 as the effective summing point, except that a fixed voltage drop equal to the potential barrier occurs across diode 96 when it conducts. As an example of the operation of circuit 84, when the amplitude of input pulse equals the barrier potential, a pulse of positive polarity having an amplitude equal to twice the potential barrier is induced into winding 92. Since a drop equal to the potential barrier occurs across diode 96, the amplitude applied to summing point 100 is equal to the amplitude induced into winding 92 less potential barrier, which in this instance is a positive polarity pulse having a magnitude equal to the potential barrier. A pulse of negative polarity and having an amplitude equal to the potential barrier is induced into winding 98 and applied to summing point 100 through resistor 98. The pulses applied to summing point 100, which are of equal amplitude and opposite polarity cancel one another and the resultant output is zero. When the input pulse to terminal 86 is less positive than the potential barrier, the positive pulse applied to summing point 100 through diode 96, after the fixed drop across the diode, will be of lesser magnitude than the negative potential pulse applied to summing point 100 through resistor 98, resulting in a negative pulse output proportional to the difference between the amplitude of the input pulse and the potential barrier of the diode. When an input pulse applied to lead 86 is greater than the potential barrier of diode 96, the amplitude of positive pulse applied to summing point 100 through diode 96 will exceed the amplitude of the negative pulse applied through resistor 98, resulting in a positive output pulse proportional to the difference. It will be apparent that the predetermined reference level $k_1$, to which comparator circuit compares its input pulse is the potential barrier of the silicon diode 96, or approximately 0.6 volt.

If desired, circuit 10 may be modified to simultaneously divide more than one dividend signal by the divisor through provision of an additional variable gain channel or channels like channel 36, FIG. 1, which have the gain control units of their cascaded amplifier circuits individually connected to control line 24.

In one representative circuit, components of the following types and values were found to be desirable:

| | |
|---|---|
| Transistor **42** | 2N778 |
| Resistor **46** | 51Ω |
| Capacitor **48** | mfd.. 6.8 |
| Resistor **50** | 910Ω |
| Transistor **52** | 2N778 |
| Resistor **56** | KΩ.. 1.2 |
| Resistor **58** | KΩ.. 20 |
| Resistor **64** | KΩ.. 1.2 |
| Capacitor **66** | mfd.. 2.5 |
| Diodes **68, 70** | FD200 |
| Capacitor **72** | mfd.. 2.5 |
| Resistors **78, 80** | KΩ.. 1 |
| Resistor **82** | 180Ω |
| Diode **96** | S266G |
| Resistor **98** | 430Ω |

Obviously many modifications and variations of the present invention are possible in the light of the above teachings. It is therefore to be understood that within the scope of the appended claims the invention may be practiced otherwise than as specifically described.

What is claimed is:

1. In a circuit for dividing a variable amplitude pulse divisor signal by a variable amplitude pulse dividend signal having therein:

(a) a matched pair of variable gain channels, (b) consisting of divisor channel and (c) dividend channel, (d) an automatic gain control circuit operatively associated with the dividend channel adapted to furnish a gain control signal responsive to difference between the amplitude of signal at the said dividend channel and a fixed reference level, said gain control signal being operative to vary the gain of the dividend channel in a sense to eliminate said difference, said gain control signal being applied to the dividend channel to vary the gain thereof in accordance with the reciprocal of the divisor signal, the improvements, in combination, comprising:

(e) each channel of said matched pair comprising a plurality of variable gain circuits connected in cascade, (f) each of said plurality of variable gain circuits comprising a set of networks consisting of an amplifying network and gain control network for controlling the gain of the amplifying network, (g) said automatic gain control circuit being adapted to apply said gain control signal to the gain control network of each set of networks to individually vary the gain of each of the cascade connected variable gain circuit.

2. A circuit in accordance with claim 1, wherein (h) the amplifying network of each set of networks is a transistor amplifier of the common collector type including a first transitsor, and (i) the gain control network comprises diode circuit means including means forming independent A.C. signal and D.C. bias paths through the diode means, said A.C. path through the diode circuit means being connected between emitter of said first transistor and signal ground, said gain control circuit adapted to vary the D.C. bias through said diode in its forward direction to thereby vary the impedance of said A.C. path to control the gain of transistor amplifier.

3. A circuit in accordance with claim 2, (j) said diode circuit means comprising first and second diodes, said diodes being connected in series connection to form said A.C. signal path, said diodes being poled with their forward directions in opposite circuit directions of said A.C. signal path and said D.C. bias path adapted to equally bias the first and second diodes.

No references cited.

MALCOLM A. MORRISON, *Primary Examiner.*